Patented Feb. 4, 1941

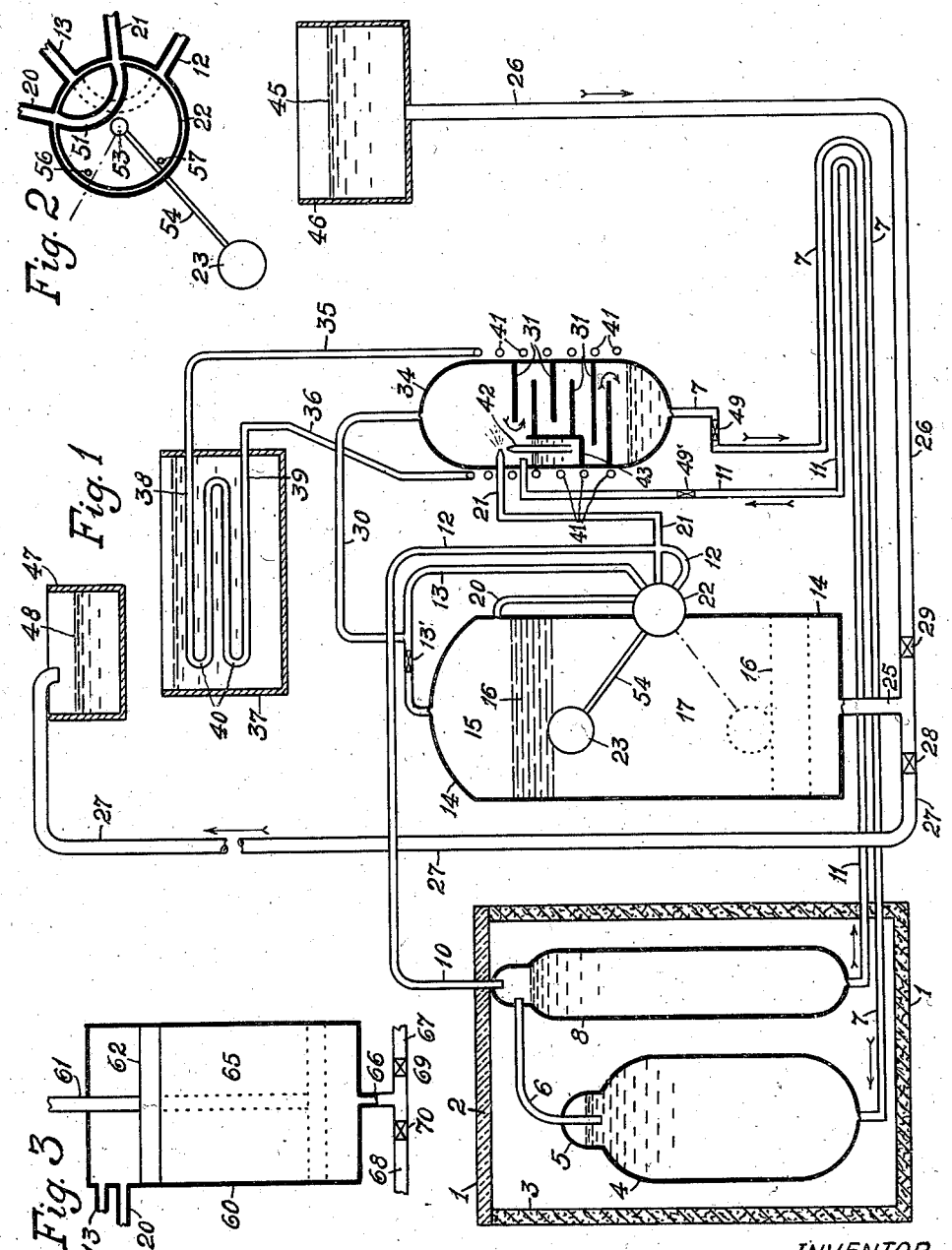

2,230,917

UNITED STATES PATENT OFFICE 2,230,917

LIFTING OF LIQUIDS BY SOLAR HEAT

Pedro Grau Triana, Habana, Cuba

Application May 22, 1939, Serial No. 275,129
In Cuba May 25, 1938

7 Claims. (Cl. 62—119)

This invention relates to the lifting of liquids by utilizing the heat of the sun's rays, and it has for its object the provision of a method of lifting liquids by utilizing the heat of the sun's rays upon gas or vapor solutions, such as ammonia gas, alcohol vapor, etc., by vaporizing the gas or vapor from the solution and taking advantage of the vaporized gas pressure to actuate upon the upper surface of a liquid and thus to impel the liquid up to a pre-determined height, the gas being then absorbed in a weakened solution of same to concentrate the solution and thereby produce a suction of a new amount of liquid to be lifted, the method comprising a series of operations forming a cycle which is continuously repeated.

Another object of the invention is to provide a closed self-operating chamber adapted to receive an amount of liquid to be lifted and on whose surface actuates the pressure exerted by a gas or vapor received on top of said chamber and from which, once withdrawn said liquid amount, the gas or vapor is withdrawn by absorption into an absorber device, thus it causing to pass into said chamber a new amount of liquid to be lifted, through the medium of a valve automatically operated by the action of a float member or by the difference in pressures upon both surfaces of a plunger within said chamber.

The invention is described with reference to the figures of the accompanying drawing, of which:

Fig. 1 is a diagrammatical illustration of a system of apparatus for carrying out the process of lifting liquids by solar heat, which forms this invention.

Fig. 2 is a diagrammatical vertical section view of a gyratory valve of horizontal axis adapted to be actuated automatically by a float member whose motion is caused by the entering or issuing of liquid in the pumping chamber.

Fig. 3 is a diagrammatic vertical sectional view of a modified form of the pumping chamber.

The method of lifting liquids by utilizing the heat of the sun's rays consists in vaporizing a gas or vapor of a solution thereof by the sun's heat, receiving the vaporized gas or vapor in a so-called pumping chamber wherein an amount of liquid to be lifted is also received, producing in the pumping chamber by the gas pressure the lifting of the contained liquid to a predetermined height, and then absorbing the gas or vapor into an absorber after utilizing its pressure, to produce thereby a suction into the pumping chamber of a new amount of liquid to be lifted.

This method is carried out by means of a system of apparatus which are diagrammatically illustrated in Fig. 1 and which consist of: a sun's heat responsive gas or vapor generator; a pump or liquid-lifting device actuated by alternate pressure and sucking actions of the vaporized gas; a gas or vapor absorber; a heat interchanging device between the generator and the absorber; a tank for the liquid to be raised; and an elevated tank for the liquid lifted.

The sun's heat responsive gas generator is composed of a square or rectangular suitably-sized box 1 made of metal or any other suitable heat conducting material, which is provided with a spaced inner lining 3 and an intermediate heat-insulating refilling 2 to prevent heat from passing out. The top face of the box 1 will be made of glass or any other transparent material to permit the pass of the sun's rays into the box which will preferably be tightly closed and with its inner surface painted with bitumen or any other heat absorbing black paint.

Within the box 1 are vertically disposed two metal bottle-shaped containers 4 and 8 which are painted in black, of which the container 4 is of larger size though lower than container 8, both containers being made of a high heat conducting metal capable of resisting action of ammonia solutions. Container 4 is tightly closed at its top portion 5 which is crossed by a tube 6 of small diameter connecting same from beneath the liquid level with the top portion 9 of container 8 which is also tightly closed and in its top portion enters the lower end of a tube 10 adapted to serve as an outlet for the gas or vapor vaporized in both containers. The tank 4 is adapted to contain a concentrate aqueous solution of a gas as ammonia and the tank 8 is adapted to contain a weakened ammonia solution in water. The container 4 is in communication at its bottom through a tube 7 with the bottom of an absorber 34 which will be described hereinafter, and the container 8 is in communication at its bottom through a tube 11 with the top portion of absorber 34, both tubes 7 and 11 being disposed in heat interchanging relation, in the manner that may be found most convenient. The tube 7 is provided with a check valve 49 opening downwardly and closing upwardly, and the tube 11 is provided with a check valve 49' opening upwardly and closing downwardly.

The pumping device consists of a closed container 14 which may be of any suitable form, such as cylindrical, and has metal walls capable of resisting the gas pressures to which it will be subjected at its operation and being of such a nature that it will not be attacked by the gas or vapor employed, its size being consistent with the gas-producing capacity of generator 1. The top chamber 15 of pumping device 14 receives the ammonia gas produced in the generator through a top opening from a tube 13 provided with a check valve 13' being opened by gas pressure and said tube 13 is connected with a gas-distributing valve 22 mounted on the side wall of container 14 and it consists of a cylinder rotatably mounted on a horizontal shaft 53 within a hollow body or cover concentrical with the cylinder, and in said wall ends the tube 13 and the tube 12 conducting the gas produced in the generator 1 at a suitable distance from one another, both tubes being communicated by the curved passageway 51 formed in the cylinder of the valve (Fig. 2). The horizontal shaft 53 is connected by an arm 54 with a float member 23 disposed within container 14. Ammonia gas is driven off from the top portion 15 of container 14 through tube 20 whose end terminates in the wall of valve 22 and which is to be communicated through curved passageway 51 of the latter with tube 21, in the lower position of float member 23, said tube 21 communicating with the top portion of absorber 34. The pumping device 14 has at its bottom an opening to which is connected a tube 25 adapted to alternately serve as an inlet and an outlet for the liquid to be lifted. Said tube 25 carries two branch tubes 26 and 27 of which the branch tube 26 is provided with a check valve 29 opening to the left hand side and closing to the right hand side and connecting with the bottom of a ground level tank 46 containing the liquid to be lifted 45, and branch tube 27 is provided with a check valve 28 opening to the left hand side and closing to the right hand side and rises to discharge into a tank 47 positioned at the height to which liquid 48 is to be lifted from pumping device 14. By means of distribution valve 22 which is actuated by float member 23, it can be controlled the time at which the ammonia gas produced by generator 1 is to penetrate into the top chamber 15 of pumping device 14 and the time at which the gas is to pass from said top chamber 15 to absorber 34. The oscillatory movement of arm 54 connecting float member 23 with shaft 53 of valve 22 causes movements of this valve in both directions when said arm 54 engages the stop pins 56 and 57 fixed on the wall of valve 22, at the last part of the upward movement and at the last part of the downward movement respectively of the float member 23, so determining the time at which the change of ammonia gas flow through valve 22 is to be effected. In this manner, when the container 14 is filling and the float member 23 moves upwards, at the time the arm 54 engages the stop pin 56, it will rotate the valve 22 until the passageway 51 will connect tubes 13 and 12 and the ammonia gas produced by generator 1 will penetrate into the top chamber 15 of pumping device 14 and the liquid contained in the container 14 will be impelled up through the tube 27; and when the container 14 is emptying and the float member 23 is moving downwards, at the time the arm 54 engages the stop pin 57, it will rotate the valve 22 until the passageway 51 will connect tubes 20 and 21 and the ammonia gas will pass from top chamber 15 to absorber 34 and the liquid 45 of the tank 46 will be sucked in the container 14.

On the surface of liquid 17 contained in container 14 is placed a layer 16 made of a substance in which will not be soluble the ammonia gas and the water and that will be lighter than water, so that it will always remain in floating position on the surface of liquid 17. Said substance may be liquid paraffine, refined petroleum, grease, or the like.

Between the generator 1 and the pumping device 14 is placed an analyzer and a rectifier (not shown) to separate ammonia gas from the water vapor that may issue from generator 1 by evaporation, said water vapor to be thus separated by condensation.

The absorber 34 is formed by a closed container, which may be of any shape, say cylindrical, to the top portion of which reaches the ammonia gas from the pumping device 14. To facilitate the dissolution of ammonia gas in the solution liquid reaching absorber 34 through tube 11, a spray of said solution liquid is disposed by means of a small tank 43 positioned interiorly adjacent the side wall of absorber 34 and the same is filled with the liquid discharging from the end of tube 11. Within the tank 43 is placed a vertical tube of small diameter 42 whose lower end opens in the liquid mass filling the container 43 and its reduced top end terminates in the proximity of the end of tube 21 discharging the gas in the top portion of absorber 34.

Within absorber 34 are placed a series of spaced horizontal plates 31 having staggered openings so that the pulverized solution liquid may have ample surfaces for contact with the ammonia gas discharged through tube 21, to permit the concentration of said solution liquid and the production of a concentrate solution 32 of ammonia gas which is collected on bottom of absorber 34. The latter is surrounded by a coil 41 wherethrough methyl chloride circulates by means of tubes 35 and 36 communicating the ends of coil 41 with the top end 38 and lower end 39 of a condensation coil 40 positioned within a condenser 37 which may be cooled by water or by air. The top end of absorber 34 is communicated through a tube 30 with the tube 13 leading ammonia gas from generator 1 so that ammonia gas not solved in absorber 34 may be returned to the top chamber 15 of the pumping device 14 through check valve 13'.

The method of lifting liquids by means of the apparatus system described is carried out as follows: Assuming the pumping device 14 filled with liquid 17 from tank 46 and the container 4 filled with an ammonia concentrate solution filling also tube 7 and the lower portion of absorber 34 to the same level by gravity, if box 1 is subjected to the direct action of the sun's rays passing through the glass cover provided at its top portion, the container 4 will become heated and a time will be when the ammonia gas will start to vaporize from the concentrate solution contained in container 4 and will be accumulated in top chamber 5 of said container. As the gas is accumulating in chamber 5, its increasing pressure will cause to lower the level of the liquid contained in container 4. When the liquid level is under the end of tube 6, a small amount of gas will escape through said tube into top chamber 9 of container 8. Thus, already weakened portions of liquid solutions will start reaching tank 8 through said tube 6 from the top portion of container 4 together with portions of ammonia gas vaporized therein. The result will be that the gas will be accumulated in top chamber 9 of container 8 and it will be forced at a certain pressure through tube 10 to tube 12 which will lead it to the distribution valve 22. The gas will then have access to the passageway 51 in view of the raised position of float member 23 and will pass therethrough to tube 13 leading it into the chamber 15 of pumping device 14. The pressed gas will be accumulated in top chamber 15 and there will be a time when the pressure by the gas accumulated in chamber 15 will actuate upon the surface of the liquid insulating layer 16, close the check valve 29 and open the check valve 28, and finally force liquid 17 contained in container 14 through outlet tube 25 and raise it through tube 27 to raised tank 47. As the float member 23 reaches its lower position and the arm 54 strikes with stop pin 57 of valve 22, no more ammonia gas from generator 1 will pass into top chamber 15 of pumping device 14, in view of the change in the position of valve 22 whose passageway 51 will now communicate tube 20 with tube 21 leading to the absorber 34 and, consequently, the pressed ammonia gas filling the container 15 will rush to absorber 34 through tube 21 and the spray action at the end of said latter tube will force the weakened ammonia solution stored in tank 34 as from container 8 through tube 11, against the walls of absorber 34 and as said weakened solution falls on plates 31 it will again dissolve the ammonia gas contained in absorber 34 and will concentrate and collect said solution on the lower portion of the absorber wherefrom it will pass by gravity into the container 4 through tube 7 in which, in view that the solution from the absorber 34 is cooled than the weakened solution circulating from the container 8 to the top portion of absorber 34, the temperature of the weakened solution will be lowered as both tubes 7 and 11 are in heat interchange relationship.

As ammonia gas is dissolved in the weakened solution in absorber 34, a vacuum is produced in top chamber 15 of pumping device 14 and in consequence thereof a sucking of water 45 contained in tank 46 will be produced, which water will pass into the container 14, the liquid pressure opening the check valve 29, whereupon the float member 23 will rise. During the period in which the container is being filled, valves 49 and 49' will remain automatically closed upon the pressure within the absorber being decreased by the dissolution of the gas contained therein, the circulation of liquid between absorber 34 and containers 4 and 8 being prevented. Likewise, check valve 13' prevents gas from passing into absorber 34 through tube 30. When the pumping device 14 is filled with water and the arm 54 of float member 23 abuts stop pin 56, the distribution valve 22 will communicate tube 12 with tube 13, through passageway 51, and the pressure of the whole system within the absorber 34 is restored, which will permit re-circulation of liquids between absorber 34 and containers 4 and 8 and fresh quantities of concentrate solution will pass toward the container 4 through valve 49 and the weakened solution from container 8 entering in absorber 34 through tube 11 and valve 49', upon valves 49 and 49' remaining open. These two stages will be alternately and continuously repeated.

In Fig. 3 is represented a modified form of pumping device consisting of a pump cylinder 60 within which is slidably mounted a plunger 62 provided with a connecting-rod 61, and said plunger receives on its top face the action of the pressed gas entering through tube 13 from generator 1, and thus it produces the impelling of the liquid contained in lower chamber 65 through tube 66 and branch tube 68 provided with check valve 70 opening to the left hand side and closing to the right hand side. The chamber above plunger 62 is in communication with the absorber 34 through the tube 20 and when the gas is sucked by absorber 34, a relative vacuum will be produced in said chamber which will raise the plunger 62 and allow the entrance of a new amount of liquid from the tank 46 through tube 67 provided with check valve 69 opening to the left hand side and closing to the right hand side.

It is obvious that changes may be made in the shape and size of the apparatus forming the system, without thereby it may be considered as altered the essential character of the invention which is such as claimed hereinafter.

What I claim is:

1. A method of lifting liquids by utilizing the heat of the sun's rays, consisting in vaporizing a gas or vapor from a solution contained in a closed chamber exposed to the sun, giving pressure to the gas or vapor, receiving the pressed gas or vapor on the top surface of an amount of liquid to be lifted which is contained in a closed container, forcing said amount of liquid up to a pre-determined height by gas or vapor pressure, and absorbing the gas in an absorber to produce in said closed container the sucking of a new amount of liquid to be lifted, and so on in repeated cycles.

2. A method of lifting liquids by utilizing the heat of the sun's rays, consisting in vaporizing a gas or vapor from a solution contained in a closed chamber exposed to the sun, giving pressure to the gas or vapor, receiving the pressed gas or vapor on the top surface of an amount of liquid to be lifted which is contained in a closed container and forcing said amount of liquid up to a pre-determined height by gas or vapor pressure, absorbing the gas or vapor in an absorber to produce in said closed container a sucking of a new amount of liquid to be lifted, dissolving the gas or vapor in said absorber in weakened solutions from the closed chamber exposed to the sun to form new concentrate solutions, and directing said concentrate solutions to the closed chamber exposed to the sun to re-vaporize the gas or vapor, and so on in repeated operating cycles.

3. A system of apparatus for lifting liquids by utilizing the heat of the sun's rays, comprising a solution containing container exposed directly to the heat of the sun's rays, means for giving pressure to the gas or vapor in the container, a second closed container containing the liquid to be lifted and being in communication with the first container to receive on its top portion the pressed gas or vapor so that the latter may by its own pressure impel the liquid contained in the second container, and an absorber in communication with the second container to induce in the second container a sucking of a new amount of liquid to be lifted.

4. A system of apparatus for lifting liquids by utilizing the heat of the sun's rays, comprising a solution containing container exposed directly to the heat of the sun's rays, means for giving pressure to the gas or vapor in the container, a second closed container adapted to receive the liquid to be lifted and above the latter the pressed gas or vapor, a gas or vapor-proof means within the second container to cover the surface of the liquid contained in said second container, an absorber in communication with the gas or vapor chamber of the second container and with the bottom of the vaporizer container to absorb the gas or vapor from the second container and to dissolve it again in the weakened solution from the first container and thus produce in the second container the sucking of a new amount of liquid to be lifted.

5. A system of apparatus for lifting liquids by utilizing the heat of the sun's rays, comprising a solution containing container exposed directly to the heat of the sun's rays, means for giving pressure to the gas or vapor in said container, a second closed container in communication at its top portion with the means for giving pressure to the gas or vapor and in communication at its lower portion with a supply of liquid to be lifted, a non-soluble layer means within the second container to cover the surface of the liquid therein, an absorber in communication at a certain height with the bottom of the first container and with the top portion of the second container to absorb the gas or vapor from the second container and to dissolve it again in the weakened solution from the first container, and a valve automatically actuated by a float member in the second container so as in one position to drive off the gas or vapor from the second container and to direct same to the absorber after the liquid contained in the second container has been lifted, thereby producing a sucking of a new amount of liquid to be entered within the second container, and in another position of said valve to allow the entrance of the pressed gas or vapor from the first container and to cause the impelling of the liquid in the second container up to a predetermined height.

6. A system of apparatus for lifting liquids by utilizing the heat of the sun's rays, comprising a solution containing container exposed directly to the heat of the sun's rays, means for giving pressure to the gas or vapor in said container, a second closed container in communication with the top portion of the means for pressing the gas or vapor and in communication at its lower portion with a liquid supply situated at a level above the second container, a non-soluble liquid layer within the second container to cover the surface of the liquid to be lifted contained in the second container, an absorber in communication at a certain height with the gas or vapor chamber of the second container and with the bottom of the vaporizing container, means for pulverizing within the absorber the weakened solution from the vaporizer by means of gas or vapor from the second container and for causing said gas or vapor to be absorbed by a weakened solution concentrating it, and a rotatable valve actuated by a float member in the liquid contained in the second container and having an appropriate passageway so as in one position to allow the pressed gas or vapor to pass into the top portion of the second container and to cause the impelling of the liquid in the latter container up to a predetermined height and in another position of said valve passageway to allow gas or vapor to pass from the second container to the absorber to be absorbed therein and to produce in the second container a sucking of a new amount of liquid to be lifted.

7. A system of apparatus for lifting liquids by utilizing the heat of the sun's rays, comprising a closed box having one face covered by a transparent material to allow the sun's rays to pass therethrough, two metal containers within said box of which one contains a concentrate solution and the other is adapted to contain a weakened solution, each container being provided with a gas or vapor pressing top chamber in communication with one another, the top portion of the container for weakened solution being of larger capacity volume than the top chamber of the container for concentrate solution, whereby the gas or vapor produced in both containers may be given pressure in the container for the weakened solution; a third closed container in communication at its lower portion with a supply of liquid to be lifted situated at a level above the third container; an oily liquid layer adapted to cover the surface of the liquid to be lifted within the third container, an absorber in communication at a certain height with the gas or vapor chamber of the third container and with the bottom of the container for the weakened solution and in communication at its bottom portion with the bottom of the container for the concentrate solution, means for associating the communication tubes of the absorber with the two vaporizer containers in heat interchange relationship, means for pulverizing within the absorber the weakened solution from the second container by means of the gas or vapor from the third container and for causing said gas or vapor to be absorbed by said weakened solution to concentrate it, a horizontal-shaft rotatable valve provided with a curved passageway and in connection with a float member in the third container so as in one position of said valve to allow the gas or vapor to pass from the vaporizer to the top chamber of the third container and thereby cause the liquid in said container to be impelled up to a pre-determined height and in the other position of the valve to allow the gas or vapor to pass from the third container to the absorber so that the gas or vapor may be absorbed in the absorber and thus produce in the third container a sucking of a new amount of liquid to be lifted, and stop means in the valve limit positions corresponding to the lower and upper limit positions of the float member.

PEDRO GRAU TRIANA.